INVENTOR.
H. FEIN

INVENTOR.
H. FEIN

United States Patent Office 3,523,259
Patented Aug. 4, 1970

3,523,259
POLARITY PULSE AUGMENTOR FOR PULSE RATE MODULATORS

Harry Fein, 832 Quarter Mile Road, Orange, Conn. 06477

Filed Apr. 8, 1968, Ser. No. 719,444
Int. Cl. H03k *7/06, 1/08*
U.S. Cl. 332—9 3 Claims

ABSTRACT OF THE DISCLOSURE

This invention is an apparatus for signalling changes in modulating signal polarity in pulse rate modulators. Each zero transition of a modulating signal produces an electrical pulse of appropriate polarity which is combined with pulses normally generated by the process of pulse rate modulation. This operation has the effect of enhancing the information content of pulse signals so augmented.

These specifications relate to an invention which is a means for improving the operation of Pulse Rate Modulation systems. It is first necessary that a brief description of Pulse Rate Modulation (here and after referred to as P.R.M.) be given so that in what follows the novelty and advantages of this invention are clearly demonstrated. A P.R.M. system is one in which a modulating signal is converted into a series of short electrical pulses whose instantaneous rate is directly and continuously proportional to the instantaneous amplitude of the modulating signal. Instantaneous rate is defined as the reciprocal of the time interval between successive pulses. This should not be confused with other well known pulse modulation systems because one characteristic feature of P.R.M. is the absence of pulses or of any clock or timing reference signal when no modulation is applied. This modulated series of impulses may then be transmitted via radio signals, by wire or recorded for subsequent playback so that ultimately this rate modulated pulse sequence will be demodulated to produce a facsimile of the original modulating signal. In what follows, sinusoidal modulating signals are assumed for convenience. It should be understood that via the well known theory of Fourier analysis, a discussion of the behavior of sinusoidal modulating signals may be generalized to include all manner of complex, time varying modulating signals such as speech, music and so forth.

Since, by its very nature, P.R.M. generates more pulses per cycle of modulating signal when the signal is large than when it is small, an inherent problem is the progressive reduction of bit content, or information, as the amplitude of the modulating signal decreases. Further, as the modulating frequency increases, the number of bits per modulating cycle also decreases. It is therefore an object of this invention to overcome, in some measure, the problem of reduced information content at high modulating frequencies and low modulating amplitudes which is inherent to P.R.M. and which has kept this system from practical use.

One important parameter of any modulating signal which should be transmitted is its polarity at any instant of time. A convenient method of conveying information as to the polarity of the modulating signal is to break the P.R.M. sequence into "polar groups"; that is, positive pulse sequences representing positive modulating signals and negative pulse sequences representing negative modulating signals. The object of this invention is to enhance the informational content of P.R.M. by creating a means to insert augmenting or extra pulses which are not normally generated by the P.R.M. process. An augmenting pulse is added to each polar group at the very instant the modulating signal changes polarity and this pulse becomes the first pulse of every polar group and is therefore an element of the P.R.M. signals that is synchronous with the modulating signal.

A complete understanding of this invention and its features and advantages may be gained by considering the following description in conjunction with the accompanying drawings, in which.

Figure 1:
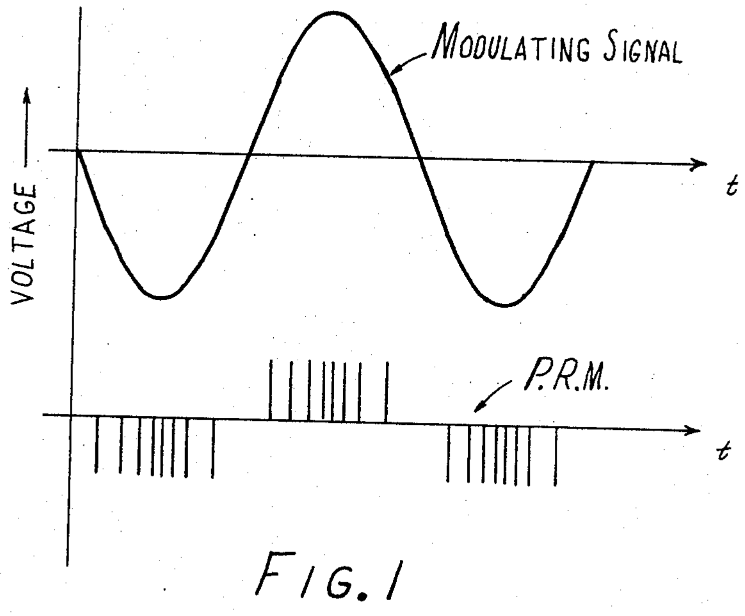
FIG. 1 is a simplified representation of an assumed sinusoidal modulating signal and the resulting bipolar pulse sequence resulting from the pulse rate modulation of the sinusoidal wave.
Figure 2:
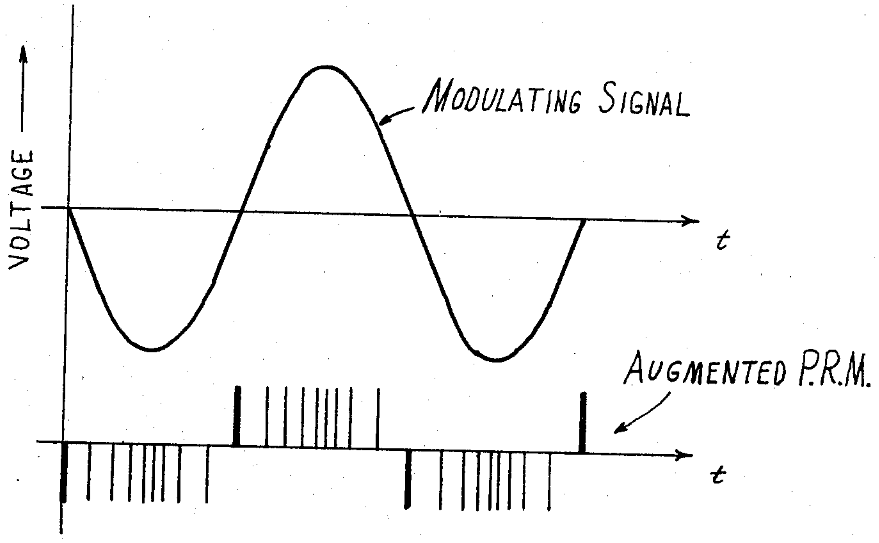
FIG. 2 is the same modulating signal as in FIG. 1 where the pulse rate modulation sequence has been augmented by the addition of polarity pulses.

Referring more particularly to FIG. 1, we see that a P.R.M. system generally involves the generation of bipolar sequences of short electrical pulses whose density in time, or instantaneous rate, is directly and continuously a function of the sinusoidal modulating signal as shown. This dependence of output rate on the magnitude of the modulating signal may in general be linear or nonlinear. The method of this invention applies regardless of the shape of what may be called the modulation transfer function, that is, the quantitative relationship between the amplitude of the modulating signal and the resulting impulse rate of the modulator. The object of this invention is the insertion of what may be called signature pulses which are the first pulse in every polar group generated by the P.R.M. independent of the actual process by which the P.R.M. is generated. FIG. 2 assumes the same sinusoidal modulating function as in FIG. 1 and indicates the change in the P.R.M. pulse sequence when augmenting pulses are introduced. The augmenting pulses in FIG. 2 are drawn more heavily than the other pulses of the modulator output only for emphasis and it should be understood that all pulses are electrically identical. It should be noted in FIG. 2 that all pulses which follow the heavily drawn polarity pulses are of the same polarity and that the appearance of this pulse, signals a change in the pulse polarity of the bipolar sequence.

Figure 3:
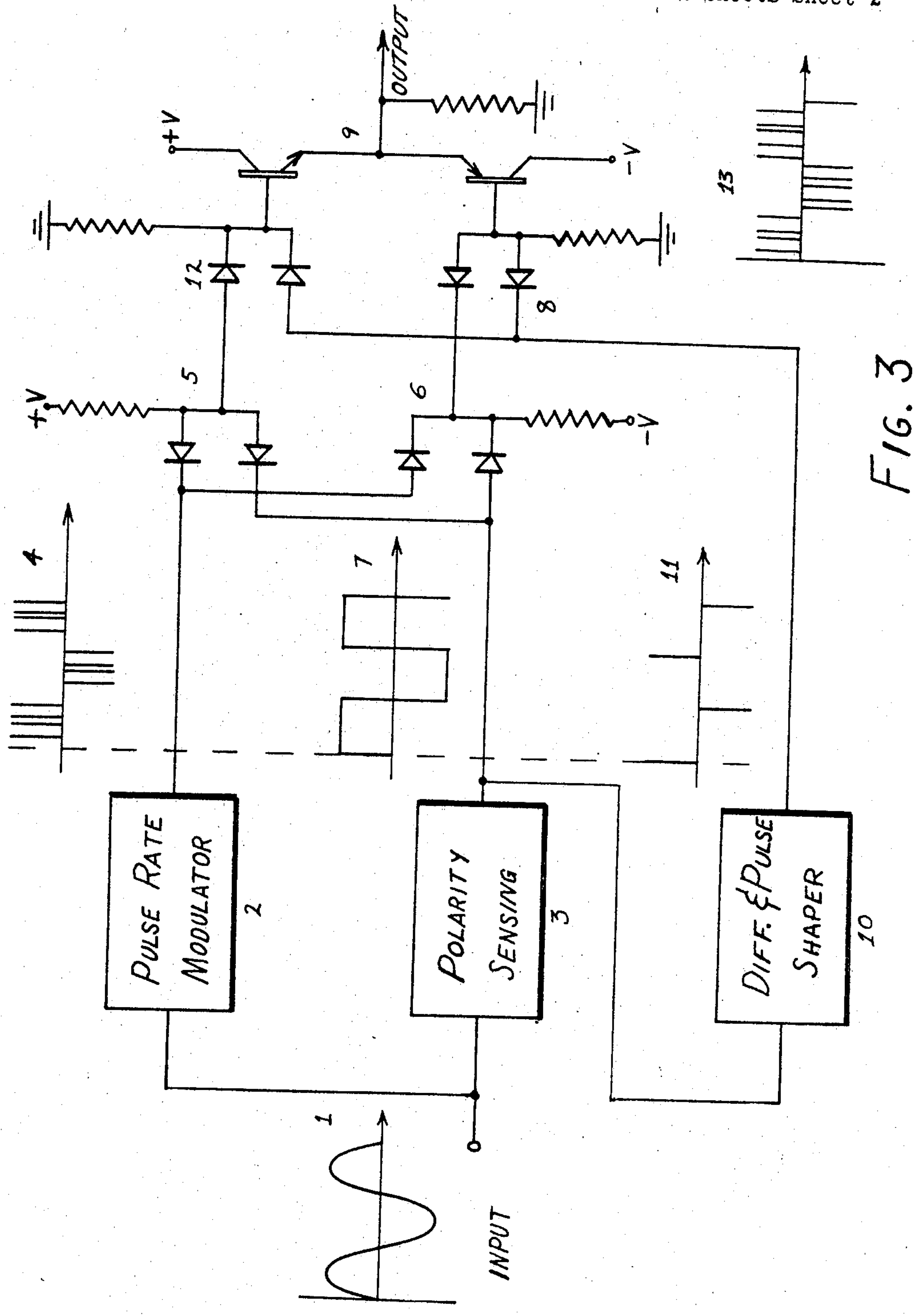
FIG. 3 is the system by which polarity augmentation is accomplished.

In FIG. 3, the method by which augmentation of P.R.M. is accomplished is portrayed. A modulating signal 1 is simultaneously applied to a pulse rate modulator 2 and to a polarity sensing circuit 3. The pulse rate modulator 2 converts the input signal to bipolar pulse sequences 4 which are rate modulated. A practical example of a linear pulse rate modulator is given by A. F. Boff, U.S. Pat. No. 3,040,273 entitled, "Voltage to Frequency Converter," issued June 19, 1962. These bipolar pulse sequences are in turn applied at the inputs of a positive AND gate 5 and a negative AND gate 6. The polarity sensing circuit 3 at its simplest is a high gain amplifier or amplitude discriminator whose output 7 quickly swings to fixed positive and negative potential limits as the modulating signal goes through its zero potential value. Polarity sensing circuits might also be called zero crossing detectors or squaring circuits. An illustrative example of a polarity sensing apparatus, of which there are many well known variations, is the familiar Schmitt trigger, an amplitude discriminator which can accurately detect the zero crossing of potentials. Thus the state of the output of the polarity sensing circuit is a function of the polarity of the input modulating signal. The output 7 of the polarity sensing circuit is applied to the inputs of the positive AND gate 5 and the negative AND gate 6 allowing positive pulses to go through the positive AND gate if the polarity signal is positive or allowing negative pulses to go through the negative AND gate if the polarity signal is negative. The output of both AND gates may then proceed through either the positive OR gate 12 or the negative OR gate 8, depending on which AND gate is operative, to a mixing stage 9 which has a common output for both pulse polarities.

Polarity augmentation of the output signal is accomplished by applying the output of the polarity sensing circuit to a differentiator and pulse shaper. The differentiator and pulse shaper 10 can be practically realized by a tandem combination of an R-C high pass filter which converts the sharp edges of the square wave polarity signal to alternating positive and negative "spikes" and pulse clippers, amplifying stages which saturate and thus limit their output to pulses of fixed amplitude. The output of the differentiator and pulse shaper is therefore pulses 11 coincident with the sharp edges of the square wave polarity signal 7. Since these sharp edges occur at very nearly the exact instant at which the modulating signal is changing its polarity, the resulting pulses 11 are passed through the OR gate of the appropriate polarity and added to the P.R.M. pulse sequence and these added or augmenting pulses will always be the first pulse in any polar group. Thus the output of the augmented modulator will be a series of bipolar groups of pulses 13 which are pulse rate modulated with extra pulses added conveying the instant of zero crossing of the original modulating signal.

What is novel and new is that I have added an element to the modulated signal which is synchronous with the zero crossing of the modulating signal and have thus added a significant amount of information which was not normally present in a pulse rate modulation signal. The usefulness of this inovation lies in the fact that P.R.M. so augmented becomes a practical and feasible communications and recording technique capable of operation at lower modulating amplitudes and higher modulating frequencies than previously possible.

The foregoing description has outlined in detail the operation and embodiment of an invention which in the light and spirit of this disclosure should enable anyone skilled in the art to accomplish these ends in this or a similar manner.

What is claimed is:

1. A pulse rate modulator with augmenting pulses to convey modulating signal polarity comprising:

pulse rate modulator means and polarity sensing means both means having as their common input said modulating signal, differentiator and pulse shaping means connected to the output of said polarity sensing means whereby positive and negative pulses similar to those generated by the pulse rate modulator are generated, AND gates operatively connected to the pulse rate modulator to pass positive pulses through the positive AND gate and negative pulses through the negative AND gate depending on the polarity connection activated from said polarity sensing circuit to said gates, OR gates operatively connected to the output of said AND gates allowing passage of pulses from aforementioned AND gates to combine at the input of said OR gates with polarity pulses conveyed by connection means from the output of said differentiator and pulse shaping circuit, a mixer circuit connected to the output of both positive and negative OR gates to produce at its output the complete bipolar pulse rate modulated signal including the augmenting polarity pulses.

2. In a system for pulse rate modulation an apparatus for signalling the polarity of modulating signals comprising: a pulse rate modulator, a polarity sensing circuit, a differentiator and pulse shaper, AND gates for negative pulses, AND gates for positive pulses, OR gates for positive pulses, OR gates for negative pulses and a mixer for combining both pulse polarities operating in concert wherein the aforesaid means are combined such that the modulating signal is connected as the common input to both said pulse rate modulator and said polarity sensing circuit, the output of both aforementioned means being connected to said positive and negative AND gates, the output of said polarity sensing circuit being also applied as input to the differentiating and pulse shaping means the output of which means is thence connected to both positive and negative OR gates together with the output of aforesaid AND gates, finally the output of all OR gates are connected to the mixer input.

3. In a system of pulse rate modulation an apparatus for insertion of modulation polarity indicating pulses comprises: an operative modulating signal, voltage to frequency means, zero crossing detector means, AND gates both positive pulse operating and negative pulse operating, OR gates both positive pulse operating and negative pulse operating, differentiator and pulse shaping means and a mixer all operating in conjunction such that the modulating signal applied as the operative signal to both the voltage to frequency means and said zero crossing means results in bipolar pulses as the output of said voltage to frequency means which is connected to both positive and negative AND gates, also connected as inputs to said AND gates is the output of the zero crossing means, said output of the zero crossing means being further connected to the differentiator and pulse shaper, said positive OR gates receiving as input connections the output of the positive AND gate and the output of said differentiator and pulse shaper, said negative OR gates receiving as input connections the output of the negative AND gate and the output of said differentiator and pulse shaper and finally outputs of both said OR gates being connected to the mixer, said mixer being the final stage of said appaartus.

References Cited

UNITED STATES PATENTS

| | | | |
|---|---|---|---|
| 2,980,858 | 4/1961 | Grondin et al. | 328—63 |
| 3,331,051 | 7/1967 | Simon | 325—41 |

ALFRED L. BRODY, Primary Examiner

U.S. Cl. X.R.

325—41; 328—57, 61, 96